United States Patent [19]

Nishizawa

[11] Patent Number: 5,186,063
[45] Date of Patent: Feb. 16, 1993

[54] TRIGGER FOR SPRING-TYPE PRETENSIONER

[75] Inventor: Muneo Nishizawa, Shiga, Japan

[73] Assignee: Takata Corporation, Tokyo, Japan

[21] Appl. No.: 748,696

[22] Filed: Aug. 22, 1991

[30] Foreign Application Priority Data

Aug. 24, 1990 [JP] Japan .................. 2-223343

[51] Int. Cl.⁵ .............................................. B60R 22/36
[52] U.S. Cl. .................................. 74/2; 280/806; 297/480
[58] Field of Search .............. 74/2; 280/803, 806, 280/807; 297/478, 479, 480

[56] References Cited

U.S. PATENT DOCUMENTS

| 4,585,184 | 4/1986 | Kawaguchi et al. | 280/806 X |
| 4,705,296 | 11/1987 | Andersson et al. | 297/480 X |
| 4,718,148 | 1/1988 | McKernon et al. | 280/806 X |
| 4,999,004 | 3/1991 | Skanberg et al. | 74/2 X |

FOREIGN PATENT DOCUMENTS

| 0239925 | 10/1987 | European Pat. Off. |  |
| 2250283 | 5/1975 | France | 297/478 |
| 57-90159 | 6/1982 | Japan . |  |
| 58-33060 | 3/1983 | Japan . |  |
| 58-206765 | 12/1983 | Japan . |  |
| 63-35017 | 9/1988 | Japan . |  |
| 1-164650 | 6/1989 | Japan . |  |
| 1-164651 | 6/1989 | Japan . |  |
| WO91/00202 | 1/1991 | PCT Int'l Appl. | 280/806 |
| 2237180 | 5/1991 | United Kingdom . |  |
| 2238461 | 6/1991 | United Kingdom . | 280/806 |
| 2242346 | 10/1991 | United Kingdom . |  |

Primary Examiner—Leslie A. Braun
Assistant Examiner—Benjamin Levi
Attorney, Agent, or Firm—Brumbaugh, Graves, Donohue & Raymond

[57] ABSTRACT

A trigger for a spring-type pretensioner providing pretension to a vehicle seat belt upon release of a preloaded spring comprises a first toggle and a second toggle connected to the first toggle. The first toggle is engaged with the operating end of a spring, and the second toggle is connected to an output member for transmitting sensor output. The first toggle supports the spring load while it is beyond its toggle dead point, and the second toggle engages the first toggle while it is not beyond its toggle dead point and restricts the operation of said first toggle. The second toggle receives the sensor output and upon being moved thereby beyond its dead point releases the first toggle, whereupon the spring preload is released and the pretensioner is operated.

1 Claim, 4 Drawing Sheets

FIG. 2

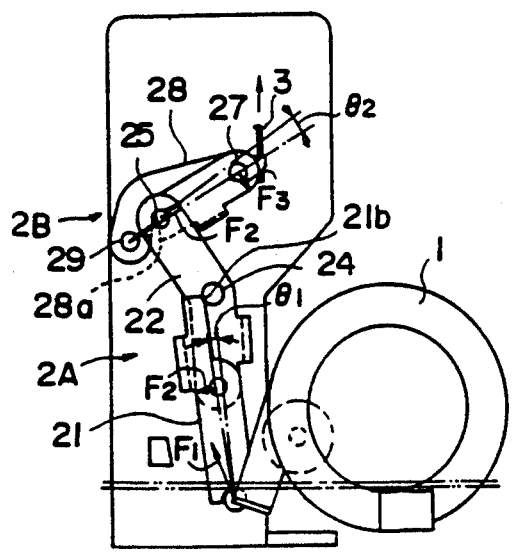
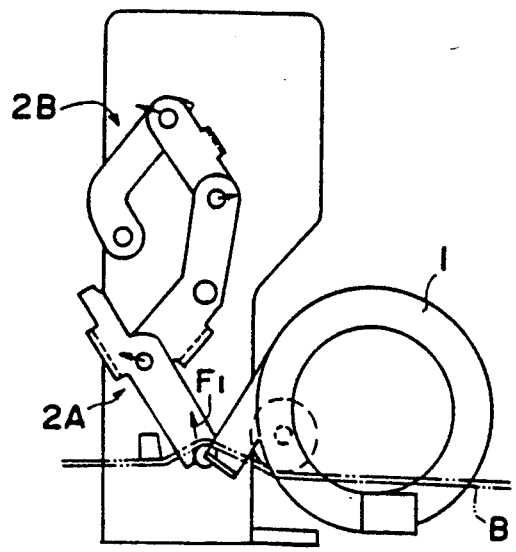
FIG. 4A  FIG. 4B
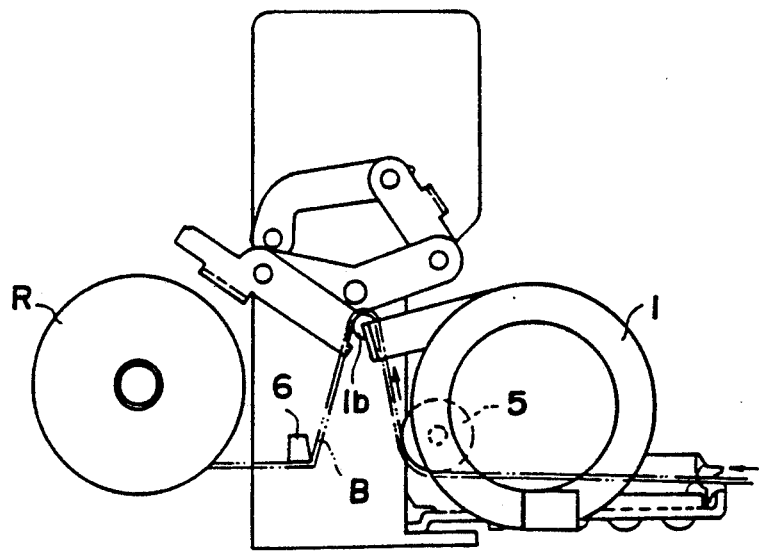
FIG. 4C

TRIGGER FOR SPRING-TYPE PRETENSIONER

BACKGROUND OF THE INVENTION

The present invention relates to a spring-type pretensioner for a vehicle seat belt system, and in particular to a trigger for operating such a pretensioner by releasing its preloaded spring.

Vehicle seat belt systems are often provided with pretensioners, which pull the belt firmly against the body of an occupant in an emergency. There are various types of pretensioners, such as ones that rotate the belt retractor reel in the belt-winding direction, ones that directly pull the belt such as by forming a loop in it, and ones that pull on the buckle stalk. As the driving source for such operation, gunpowder is often used.

When gunpowder is used as the driving source, an electric trigger is required to operate it, resulting in an increased cost. To avoid this problem, spring-type pretensioners, which are purely mechanical devices that use a spring as the driving source, have been proposed.

Regardless of the type of pretensioner, the driving source for operating the pretensioner must have sufficient operating force and stroke to complete the belt-tensioning operation within a very short time after a collision of the vehicle. For this reason, spring-type pretensioners require a powerful spring held with a very large preload. To hold the preload, it is necessary to have a trigger mechanism that provides a large operating force and an acceleration detecting sensor that produces a mechanical signal to initiate the operation of the trigger mechanism to release the spring preload.

Mechanical trigger mechanisms and sensors have been disclosed in the Japanese Provisional Utility Model Publications No. 90159/1982 and No. 33060/1983 (Japanese Utility Model Publication No. 35017/1988), Japanese Provisional Patent Publications No. 206765/1983, No. 164650/1989, and No. 164651/1989. All of these devices are based on arrangements in which the restraint of the spring is released upon movement of an inertia body that directly restrains a trigger mechanism.

In the conventional arrangements as described in the aforementioned references, it is necessary to have a large inertia body to obtain sufficient sensor output and a lever with a long arm to amplify the sensor output to provide a large operating force. The large size and weight of these mechanisms associated with the pretensioner are undesirable.

SUMMARY OF THE INVENTION

The object of the present invention is to provide a trigger for a spring-type pretensioner that is operated by a small sensor output.

To attain the above object, a trigger according to the present invention is provided for initiating operation of a pretensioner that pretensions the seat belt by operating on suitable components of seat belt systems upon releasing the preloaded spring of the pretensioner in response to a sensor output. The invention is characterized in that there is a first toggle normally engaging an operating portion of the spring and holding the spring in the preloaded condition, in that there is a second toggle coupled to the first toggle, in that the second toggle is normally in a state not beyond its dead point and holds the first toggle in a position beyond its dead point against movement farther from its dead point, and in that the second toggle is connected to an output member of a sensor that is adapted to move the second toggle past its dead point and thereby enable articulation of both toggles so as to release the spring.

In a trigger for a spring-type pretensionser according to the present invention, the first toggle which is engaged with and holds the operating end of a spring in its preloaded condition is arranged in the state beyond its toggle dead point. The second toggle, which engages the first toggle, is in the state not beyond its toggle dead point and restricts the operation of the first toggle. When a sensor output is produced, the second toggle receives the sensor output and releases the first toggle, and the preloaded spring of the pretension is released by the operation of the first toggle. As a result, the pretensioner operates and pretensions the seat belt.

For a better understanding of the invention, reference may be made to the following description of exemplary embodiments, taken in conjunction with the accompanying drawings.

DESCRIPTION OF THE DRAWINGS

FIG. 2 a top plan view of the embodiment of FIG. 1;

FIGS. 4A, 4B and 4C show the operation of the embodiment in different stages.

DESCRIPTION OF THE EMBODIMENT

Figure 1:
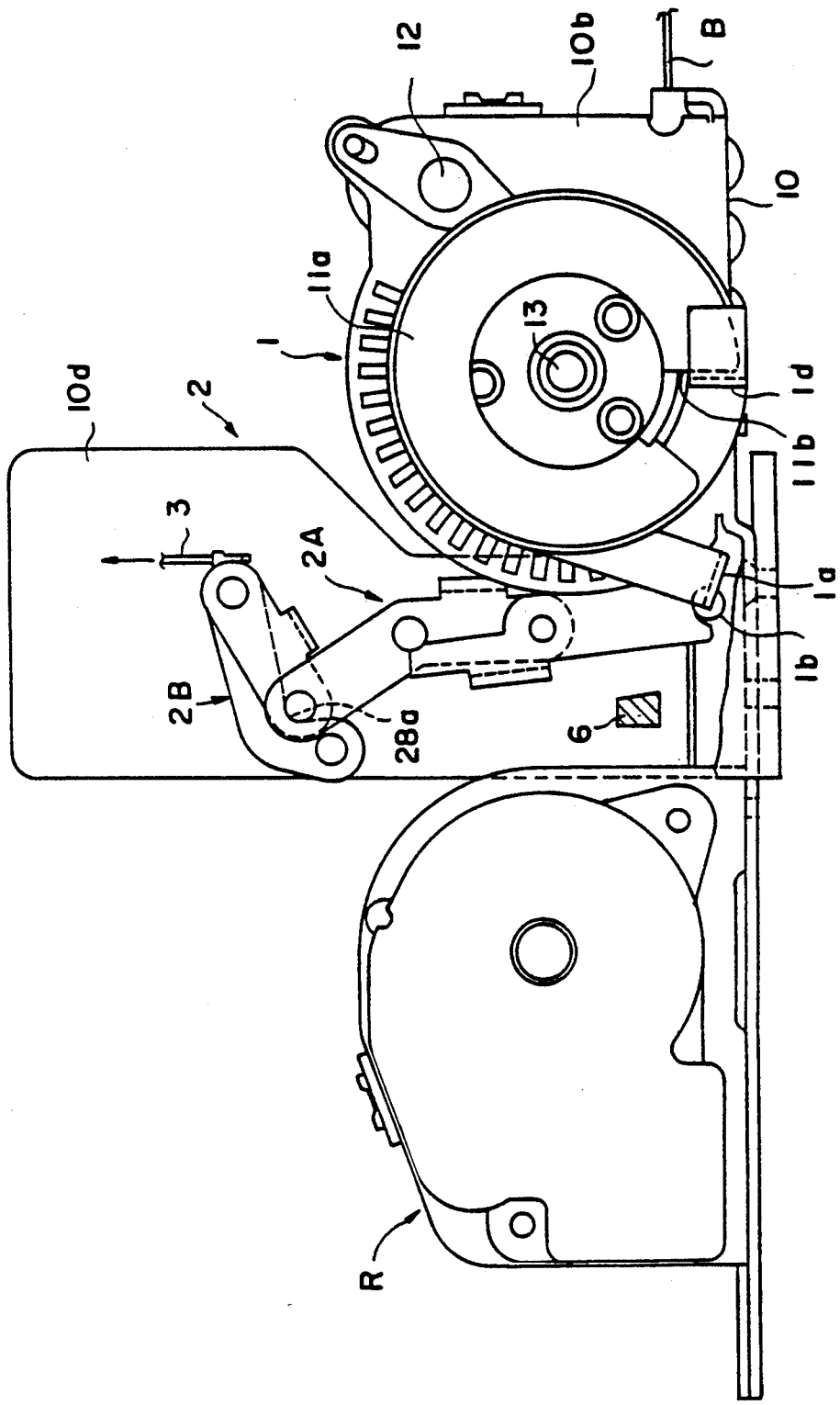
FIG. 1 is a side elevational view, with parts of the frame broken away, of a spring-type pretensioner having a trigger embodying the present invention.
Figure 3:
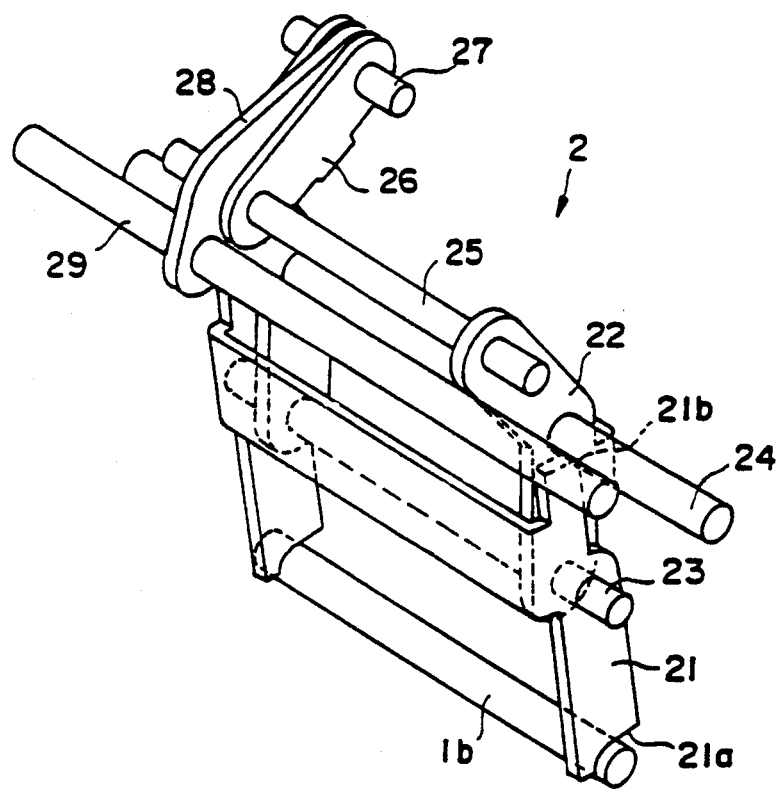
FIG. 3 a perspective view showing only the trigger mechanism FIGS. 1 and 2.

In the embodiment of the present invention shown in the drawings, a pretensioner pretensions a belt B, which is a component of a seat belt system, when a preloaded torsion coil spring 1 is released in response to a sensor output. The trigger 2 normally maintains the spring preload by engaging and holding the operating ends $1a$ of coil springs 1 against displacement. The trigger 2 comprises a first toggle 2A and a second toggle 2B connected to the first toggle 2A. The first toggle 2A normally engages the operating ends $1a$ of the coil springs 1 through a belt-engaging rod $1b$, and the second toggle 2B is connected to a wire cable 3, which is an output member of an acceleration sensor. The first toggle 2A keeps the coil springs 1 preloaded while it is in a state beyond its dead point, and the second toggle 2B engages the first toggle 2A while it is in a state not beyond its dead point and prevents the articulation of the first toggle 2A.

The pretensioner is incorporated in a frame 10, which also carries a retractor R of any type conventionally used in a seat belt system. The pretensioner comprises, in addition to the coil springs 1 and the trigger 2 for operating it, a belt clamp 4 for maintaining pretension in the belt B after the pretensioner has operated. The coil springs 1 have coil portions provided on both sides of the frame 10. The belt clamp 4 is mounted on the frame 10, and the trigger 2 is located between the retractor R and the belt clamp 4.

Figure 2:
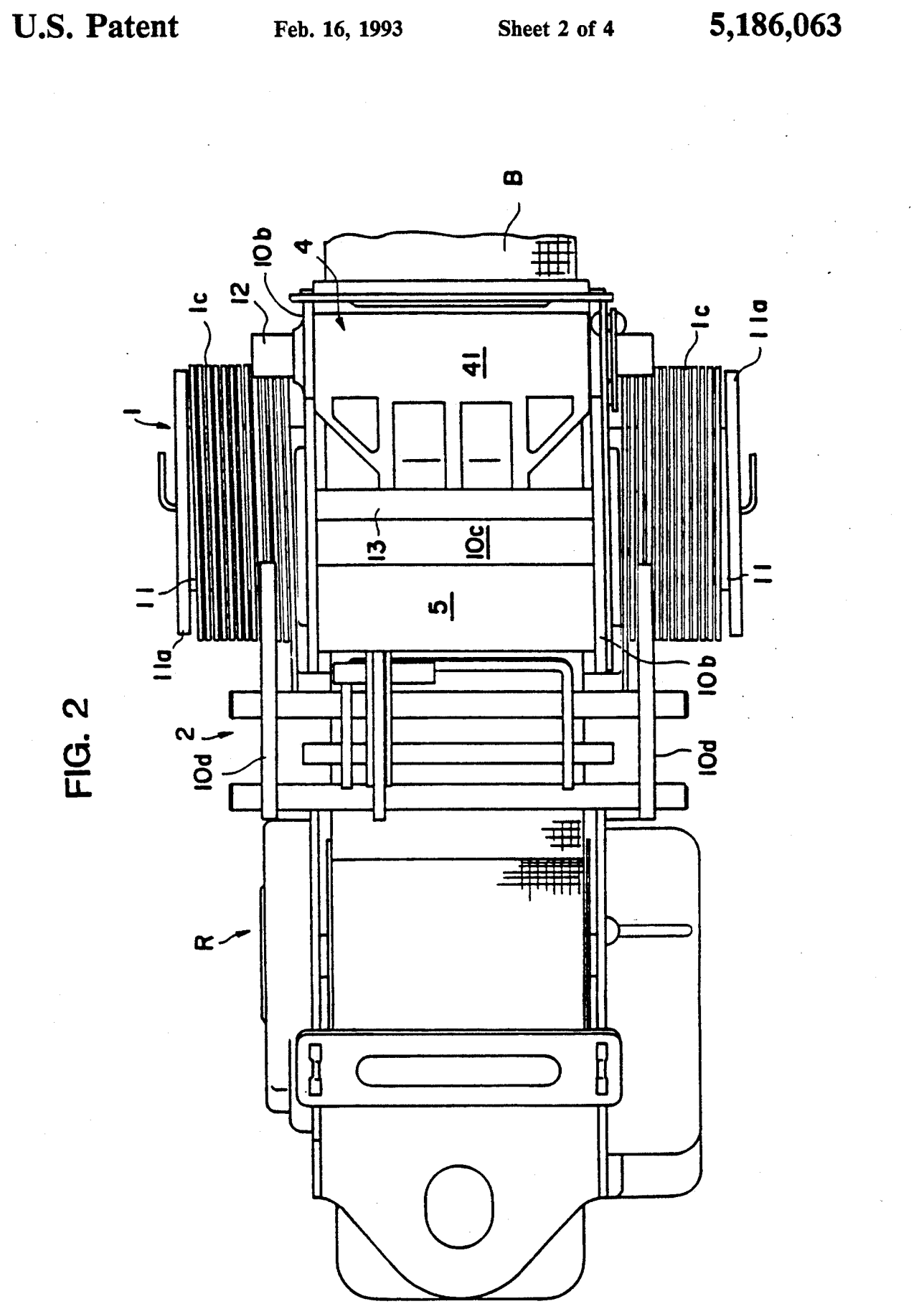

The coil portions $1c$ of the coil springs 1 are received and retained on cylindrical spring receptacles 11 on the frame 10. Each receptacle has a flange $11a$ on its laterally outer end. An end portion $1d$ on the outermost portion of each spring coil $1s$ t outwardly and is engaged on a notch $11b$ of the flange $11a$. The operating end $1a$ on the innermost portion of each coil $1c$ traverses the base of the frame 10 and meets the operating end $1a$ of the coil spring 1 on the opposite side of the frame 10. A cylindrical belt-engaging rod 1b is mounted on the operating ends 1a of the springs I. The rod 1b is located between the belt B and the base of the frame 10 when the pretensioner is in its set condition as shown in FIG. 1 and FIG. 2.

The belt clamp 4 comprises a clamp lever arm 41 rotatably mounted on a shaft 12, the ends of which are supported by side flanges 10b of the frame 10. (Snap rings for retaining the shaft are not shown in the drawings.) The belt clamp 4 prevents extension of the pretensioned belt B by forcing it against a clamp shoe (not shown) slidably supported on the base of the frame 10. A shaft 13 for supporting the spring receptacles 11, a spacer member 10c for preventing the deformation of the side flanges 10b, and a support shaft of a belt guide 5 are mounted in the frame side flanges 10b.

The trigger 2 is supported by side flanges 10d of the frame 10. Each member of each toggle 2A and 2B comprises a pair of lever arms connected by a bridging portion. The bottom ends 21a of the arms of the lower member 21 of the first toggle 2A hold the preload of the coil springs 1 by engaging the belt receiving rod 1b. The lower member 21 is pivotally mounted on a pivot shaft 23. A stopper notch 21b in contact with the first toggle support shaft 24 is provided on the upper end of each arm of the lower member 21. The first toggle support shaft 24 is supported on the side flanges 10d of the frame. The arms of the upper member 22 are pivotally supported at their intermediate portions on the support shaft 24. The lower ends of the arms of the member 22 are pivotally mounted on the pivot shaft 23, and the upper ends are pivotally mounted on a connecting shaft 25 by which the first toggle 2A is coupled to the second toggle 2B.

The arms of the member 26 of the second toggle 2B are pivotally mounted on the connecting shaft 25 at one end, and the other ends are pivotally mounted on a pivot shaft 27. The other member 28 of the second toggle 28 has one end pivotally mounted on the pivot shaft 27 and the other end pivotally mounted on a second toggle support shaft 29, which is mounted in the side flanges 10d of the frame. As shown in FIG. 1, the member 28 is curved, and the inner side of the curve is engaged with the connecting shaft 25, thereby forming an engagement surface 28a that restricts the positions of the toggles.

The pretensioner is held in set, preloaded condition by the trigger when the operating ends 1a of the coil springs 1 are held in a position below the path of the belt B, as shown in FIGS. 1 to 3 and 4A. The lower member 21 of the first toggle 2A has its stopper notch 21b contacted by the first toggle support shaft 24, and this condition is maintained by the second toggle 2B, inasmuch as the connecting shaft 25 engages the engagement surface 28a of the member 28. In this set condition, the first toggle 2A is in an extended position in which a small angle $\theta 1$ is formed between the members in a direction on the release side of the load support condition, i.e., at a position beyond the toggle dead point. Thus, the first toggle 2A receives a force in a direction to articulate the toggle. This force is applied as a force F2 to the connecting shaft 25 that joins the first toggle 2A to the second toggle 2B in a direction tending to move said shaft rightward in the figure. Because the axis of the connecting shaft 25 is located a little above a line that connects the pivot shaft 27 and the second toggle support shaft 29, a downward force F3 is applied to the pivot shaft 27, and the trigger 2 is maintained at the set position shown in FIG. 4A. The second toggle 2B is held at the position slightly ahead of the dead point by an angle $\theta 2$, i.e., at the position not beyond the toggle dead point and fixed. Thus, the pretensioner is retained in the set condition, as shown in FIGS. 1 to 3 and FIG. 4A by the trigger 2.

When a high acceleration in a vehicle collision exceeds a predetermined level G, the mechanical output from the sensor (not shown) is transmitted through the wire cable 3 and works as a force to pull up the pivot shaft 27. As shown in FIG. 4A, this force pulls the pivot shaft 27 upwardly by a force higher than the downward force F3 applied on the pivot shaft 27. As a result, the connecting shaft 25 connecting the two toggles 2A and 2B moves toward the opposite side beyond the dead point of the toggle 2B, and the set condition is released at this moment. The forces acting in the directions of the arrows are applied on each of the pivot shafts by the spring load F1, as shown in FIG. 4B, and the toggles 2A and 2B articulate. FIG. 4C shows the condition of greatest articulation of the toggles.

In practice, to minimize the inertial forces to resisting the movement of the operating ends of the springs, the ends 21a of the member 21 disengage the rod 1b when the first toggle 2A articulates partially so that the spring becomes separated from the toggle mechanism and pulls the belt B upward. The part of the belt on the retractor R side of the rod 1b is prevented from pulling out by the retractor R, and the belt B is pulled up into an inverted V loop by the spring-receiving rod 1b with the guide bar 6 as a fixed bending point and the belt guide 5 as a sliding bending point. As the result, the belt B is pulled back in the direction of the arrow in FIG. 4C and is pretensioned against the vehicle occupant. After operation of the pretensioner, a force is generated to pull the belt B out by the inertia force applied to it by the occupant's body, but such pulling out of the belt B is prevented by the operation of the belt clamp 4 including the clamp arm 41, which is released from the locked position by the coil springs 1, thus preventing the release of the belt pretension.

In the pretensioner of this embodiment, if the angles $\theta 1$ and $\theta 2$ are set to low values (normally 0°–10°), it is possible to minimize the force F3 (to about 1 kgf) necessary for releasing the pretensioner, even when the set load F1 is high (say, about 100 to 200 kgf). The operating stroke of the wire cable 3 required for rotating the member 28 in this mechanism by the angle $\theta 2$ can be as little as 0.5 to 2 mm.

In the above description, the features of the invention are exemplified by an embodiment, but the present invention is not limited to the above embodiment, and various changes and modifications can be made within the scope of the claims attached hereto.

It is possible with a trigger for a spring-type pretensioner according to the present invention to initiate the action of a powerful spring with only a small operating force and operating stroke by the combination of toggles and to release the set load by a small operating force despite the high set load of the spring. This makes it possible to set the preload of the spring to a high value and to provide a spring-type pretensioner that can eliminate the slack of a seat belt as much as possible.

I claim:

1. A trigger for a spring-type pretensioner for use in a vehicle seat belt system to apply pretension to the seat belt upon release of a normally preloaded spring characterized in that there is a first toggle normally engaging an operating portion of the spring and holding the spring in the preloaded condition, the first toggle having a dead point, in that there is a second toggle coupled to the first toggle, the second toggle having a dead point, in that the second toggle is normally in a state not beyond its dead point and holds the first toggel in a state beyond the dead point of the first toggle against movement farther from the dead point, and in that the second toggle is connected to an output member of a sensor that is adapted to move the second toggle beyond its dead point so as to enable both toggles to articulate and release the spring.

* * * * *

UNITED STATES PATENT AND TRADEMARK OFFICE
CERTIFICATE OF CORRECTION

PATENT NO. : 5,186,063
DATED : Feb. 16, 1993
INVENTOR(S) : Nishizawa

It is certified that error appears in the above-identified patent and that said Letters Patent is hereby corrected as shown below:

Col. 2, line 65, "1s t" should read --1c is bent--.

Col. 5, line 7, "toggel" should read --toggle--.

Col. 6, line 2, "dead point" should read --dead point of the first toggle--.

Signed and Sealed this

Thirtieth Day of November, 1993

Attest:

BRUCE LEHMAN

Attesting Officer

Commissioner of Patents and Trademarks